United States Patent
Vuong

(10) Patent No.: US 7,979,469 B2
(45) Date of Patent: Jul. 12, 2011

(54) HANDHELD ELECTRONIC DEVICE AND ASSOCIATED METHOD EMPLOYING A MULTIPLE-AXIS INPUT DEVICE AND ARRANGING WORDS OF AN EXISTING MESSAGE THREAD IN VARIOUS LINGUISTIC CATEGORIES FOR SELECTION DURING TEXT ENTRY

(75) Inventor: Thanh Vuong, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1015 days.

(21) Appl. No.: 11/831,491

(22) Filed: Jul. 31, 2007

(65) Prior Publication Data

US 2008/0009300 A1     Jan. 10, 2008

Related U.S. Application Data

(63) Continuation-in-part of application No. 11/423,986, filed on Jun. 14, 2006, now Pat. No. 7,778,957.

(51) Int. Cl.
G06F 17/00 (2006.01)

(52) U.S. Cl. ......... 707/791; 707/802; 707/822; 707/828

(58) Field of Classification Search ........... 707/600–831
See application file for complete search history.

(56) References Cited

U.S. PATENT DOCUMENTS

| 6,008,799 A | 12/1999 | Van Kleeck |
| 6,205,342 B1 | 3/2001 | Oakes et al. |
| 2002/0154164 A1 | 10/2002 | Clapper |
| 2003/0023792 A1 | 1/2003 | Schneider |
| 2004/0038670 A1 | 2/2004 | Ando et al. |
| 2004/0164973 A1* | 8/2004 | Nakano et al. ................ 345/184 |
| 2005/0210402 A1 | 9/2005 | Gunn et al. |
| 2005/0246365 A1 | 11/2005 | Lowles et al. |
| 2006/0069990 A1 | 3/2006 | Yozell-Epstein et al. |

FOREIGN PATENT DOCUMENTS

| EP | 1320023 | 6/2003 |
| GB | 2396940 A | 7/2004 |
| WO | 9833111 | 7/1998 |

(Continued)

OTHER PUBLICATIONS

Extended European Search Report in corresponding European Patent Application No. 06253076.1, dated Aug. 17, 2006 (7 pages).

(Continued)

*Primary Examiner* — Isaac M Woo
(74) *Attorney, Agent, or Firm* — Finnegan, Henderson, Farabow, Garrett & Dunner, LLP

(57) ABSTRACT

A method of facilitating the entry of text into a new message generated by a messaging application of a handheld electronic device is provided that includes receiving a command to reply to or forward a received message that is included within a message thread, scanning the message thread, identifying a plurality of words in the message thread, generating one or more word lists that include the identified words, and displaying the one or more word lists. The method further includes receiving a selection of a selected one of the words from the one or more word lists, and entering the selected one of the words into the new message. Also provided is an improved handheld electronic device that implements the described method.

20 Claims, 10 Drawing Sheets

FOREIGN PATENT DOCUMENTS

| WO | 03/060451 A1 | 7/2003 |
|---|---|---|
| WO | 2004012323 | 1/2004 |

OTHER PUBLICATIONS

Communication in corresponding European Patent Application No. 06253076.1, dated Jul. 26, 2007 (6 pages).

Communication in corresponding European Patent Application No. 06253076.1, dated Jun. 13, 2008 (6 pages).

Communication in corresponding European Patent Application No. 06253076.1, dated Jun. 3, 2009 (5 pages).

Communication in corresponding Canadian Patent Application No. 2,588,526, dated Jul. 29, 2009 (2 pages).

Communication in corresponding Canadian Patent Application No. 2,588,526, dated Jul. 29, 2010 (3 pages).

* cited by examiner

```
                          MON. JAN. 3, 2005
52 — 12:45  P    JOHN SMITH  56   56   60 — BASEBALL SCHEDULE
52 — 12:02  P    ZIGLEVEIT JONES        — TOMORROW'S PARTY
52 — 10:02  A    STEVEN PATTON     60 — LUNCH ?
52 — 8:02   A    JAMES DOE       56   60 — HAPPY HOUR TONIGHT
                                56    60
```

```
                56              52
FROM: JOHN SMITH
TO: ANDREW WILLIAMS
CC: JAMES DOE         60
SUBJECT: BBALL SCHEDULE
─────────────────────────────────
Hi Andrew:
Is there a particular colour of shirt we should
wear or will be supplied bibs or jerseys?

Thanks
John
```

62 brackets the message body.

```
┌─────────────────────────────────────────────────────────────┐ ─64
│ FROM: JOHN SMITH                                            │
│ TO: ANDREW WILLIAMS                                         │
│ CC: JAMES DOE                                               │
│                              ─60                            │
│ SUBJECT: BBALL SCHEDULE                                     │
├─────────────────────────────────────────────────────────────┤
│ Dear John,                                    ─70           │
│ Thanks for the message. We will get ▮                       │
│                                                             │
│                                               ─66           │
│ ── Original Message ──                                      │
│ Hi Andre┌──────────────┬──────────────┬──────────────┐      │
│ Is there│NOUNS (ALT#)  │VERBS (SHIFT#)│LONG (FN#)    │      │
│ wear or │1. shirt      │1. wear       │1. particular │      │
│         │2. bibs       │2. supplied   │2. supplied   │      │
│ Thanks  │3. jerseys    │              │3. colour     │      │
│ John    │4. colour     │              │4. jerseys    │      │
│         └──────────────┴──────────────┴──────────────┘      │
└─────────────────────────────────────────────────────────────┘
```

Same as FIG. 6 but with "jerseys" inserted at cursor position 70:

"Thanks for the message. We will get jerseys▮"

*FIG. 7*

HANDHELD ELECTRONIC DEVICE AND ASSOCIATED METHOD EMPLOYING A MULTIPLE-AXIS INPUT DEVICE AND ARRANGING WORDS OF AN EXISTING MESSAGE THREAD IN VARIOUS LINGUISTIC CATEGORIES FOR SELECTION DURING TEXT ENTRY

CROSS-REFERENCE TO RELATED APPLICATION

This application claims priority from and claims the benefit of U.S. patent application Ser. No. 11/423,986 filed Jun. 14, 2006, the disclosures of which are incorporated herein by reference.

BACKGROUND

1. Technical Field

The concept disclosed herein relates generally to handheld electronic devices and, more particularly, to a handheld electronic device that provides assisted entry of text based upon an existing message thread.

2. Description of the Related Art

Numerous types of handheld electronic devices are known. Examples of such handheld electronic devices include, for instance, personal data assistants (PDAs), handheld computers, two-way pagers, cellular telephones and the like. Many handheld electronic devices also feature a wireless or other communication capability, although other handheld electronic devices are stand-alone devices that are functional without communication with other devices. Such handheld electronic devices are generally intended to be portable, and thus are of a relatively compact configuration in which keys and other structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable.

In language entry applications, such as in an email or other messaging application, a keypad must be capable of generating substantially all of the elements desirable or necessary to form the relevant language. For example, in a language that employs Latin letters, a keypad must be capable of generating substantially all twenty-six of the Latin letters. In order to provide such functionality with relatively few keys, some keypads have included multiple linguistic elements per key, such as providing a plurality of Latin letters on each of at least some of the keys when the keypad is used to generate a language that employs Latin letters.

In order to make use of the multiple linguistic elements on any given key, numerous keystroke interpretation systems have been provided. For instance, a "multi-tap system" allows a user to substantially unambiguously specify a particular linguistic element, for example, on a key by pressing the same key a number of times equal to the position of the desired linguistic element on the key. Another keystroke interpretation system includes key chording in which keys are pressed in various combinations to achieve particular results. Still another keystroke interpretation system might include a disambiguation routine which seeks to interpret the keystrokes in view of stored dictionary data, linguistic rules, stored algorithms, and/or the like.

When replying to a previously received message (which may be part of a larger message thread), a user of a handheld electronic device may often want to enter words that appear in the previous message thread. In current handheld electronic devices, users are required to simply type the desired words using the keyboard provided with the handheld electronic device. As will be appreciated, this text entry can at times be cumbersome, especially when lengthy or unfamiliar words are being entered. This is especially true for handled electronic devices having reduced keyboards and employing a keystroke interpretation system as described above because in some keystroke interpretation systems, a user must expend substantial effort in entering language. It thus would be desirable to provide a handheld electronic device, such as a device having a reduced keyboard, wherein the device might make available to a user for simplified entry words form an existing message thread that the user might reasonably be expected to enter.

BRIEF DESCRIPTION OF THE DRAWINGS

A full understanding of the invention can be gained from the following Description of the Preferred Embodiments when read in conjunction with the accompanying drawings in which:

FIG. 3 is a first exemplary output on the handheld electronic device of FIG. 1 showing a number of messages received thereby;

FIG. 5 is an exemplary output on the handheld electronic device of FIG. 1 in accordance with an aspect of the concept disclosed; and FIG. 6 is another exemplary output on the handheld electronic device of FIG. 1 in accordance with an aspect of the concept disclosed;

FIG. 7 is still another exemplary output on the handheld electronic device of FIG. 1 in accordance with an aspect of the concept disclosed;

Similar numerals refer to similar parts throughout the specification.

DESCRIPTION OF THE PREFERRED EMBODIMENTS

Figure 1:
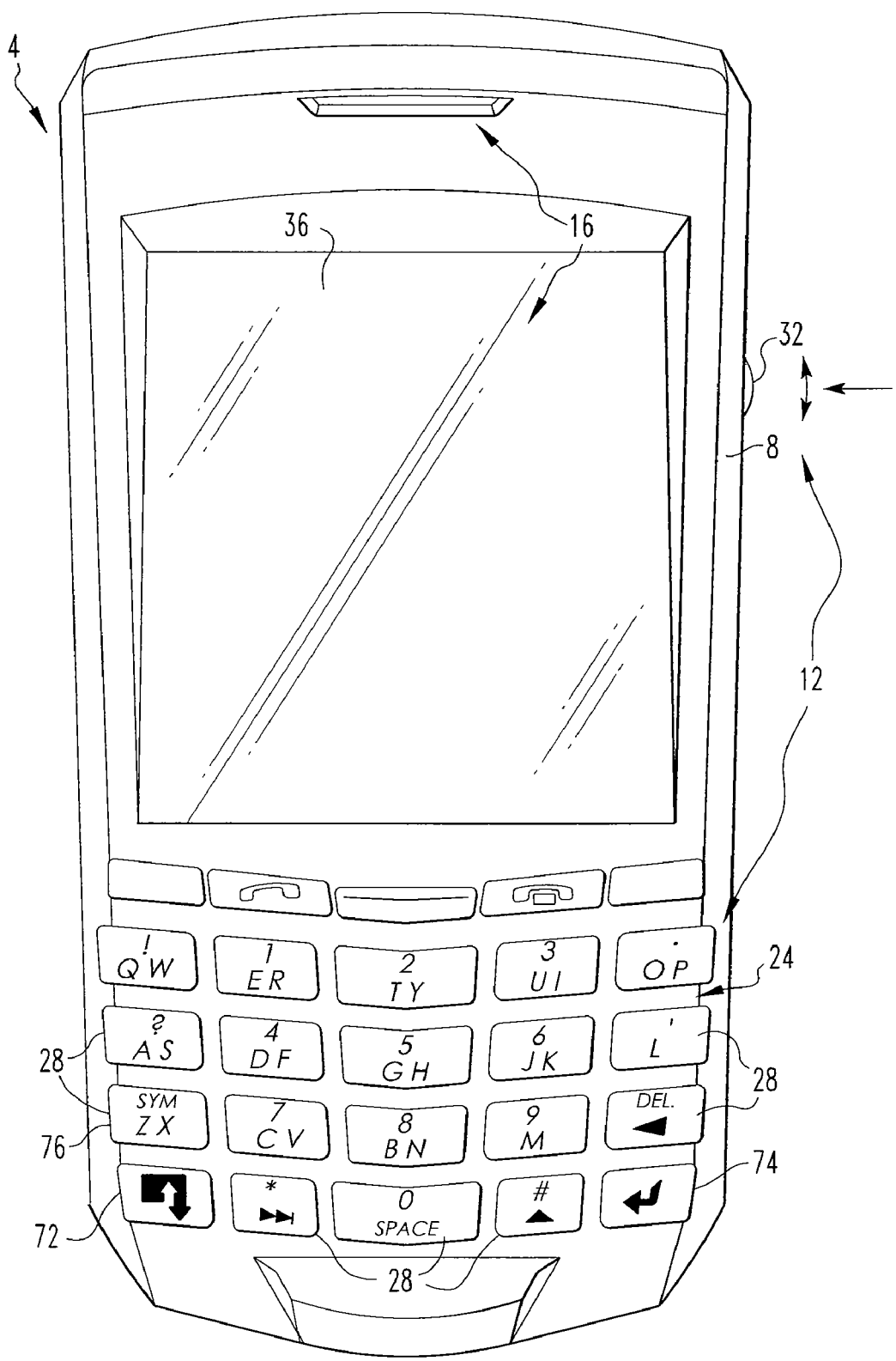
FIG. 1 is a front elevational view of an embodiment of an improved handheld electronic device in accordance with the concept disclosed herein.

A method of facilitating the entry of text into a new message generated by a messaging application of a handheld electronic device is provided that makes it easier for a user of the device to enter words from an existing message thread to which the user is responding. The method includes receiving a command to reply to or forward a received message that is included within a message thread, and scanning the message thread and identifying a plurality of words in the message thread. The method further includes generating one or more word lists that include the identified words, and displaying the one or more word lists. Finally, the method includes receiving a selection of a selected one of the words from the one or more word lists, and entering the selected one of the words into the new message. In one particular embodiment, each of the word lists represents a word category, and the generating step includes categorizing each of the identified words and placing each of the categorized words in one or more of the word lists based on how the word is categorized. For example, a first one of the word lists may represent a word category including words having at least a predetermined length, and the placing step may include placing all of the identified words having at least the predetermined length on the first one of the word lists. Alternatively, a plurality of the word lists may each represent a word category including words having a particular grammatical classification, such as noun or verb, and the placing step may include placing each of one or more of the identified words on an appropriate one of the plurality of word lists based on the grammatical classification of each word.

Also, the said scanning and generating steps may be performed automatically in response to receiving the command to reply to or forward a received message, such as a special "reply with word list" or "forward with word list" command selected from, for example, a menu provided on the handheld electronic device. Alternatively, the scanning, generating and displaying steps may be performed only after receiving a command form the user indicating a desire to have the word lists displayed so that the user can make selections therefrom.

In still a further alternative embodiment, the method further includes storing the one or more word lists, either on the handheld electronic device or on a separate device (e.g., PC) for archival purposes, and displaying the stored word lists when a subsequent message is generated using said handheld electronic device. For example, the word lists may be stored in association with the party that sent the originally received message, and the subsequent message in that case may be a message intended for that sender.

In another embodiment, a method of facilitating the entry of text into a new message generated by a messaging application of a handheld electronic device is provided that includes receiving a command to generate the new message, displaying a most frequently used words list that includes a predetermined number of words that have been determined to have been used most frequently by a user of the handheld electronic device in creating messages, receiving one or more word selections from the list, entering the selected into the new message, receiving manual input of text and entering the text into the new message, and updating the most frequently used words list based on the contents of the new message following the entering steps.

An improved handheld electronic device is also provided that includes an input apparatus, an output apparatus, and a processor apparatus including a processor and a memory. The memory has a messaging application executable by the processor that includes one or more routines adapted to implement the various embodiments of the method described herein.

Figure 2:
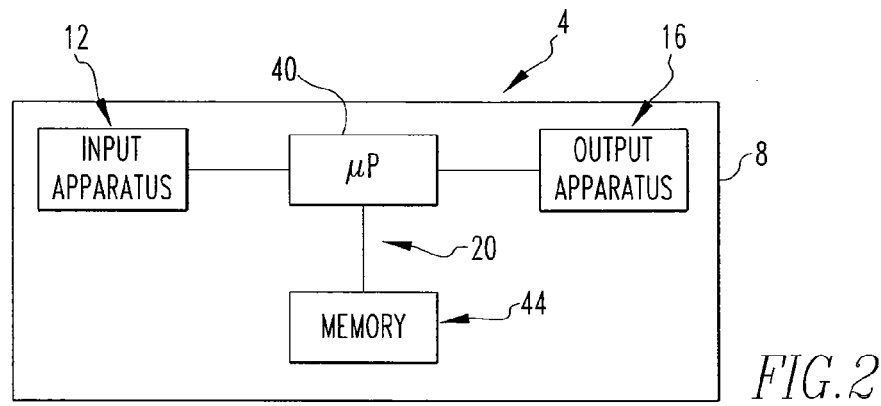
FIG. 2 is a block diagram of the handheld electronic device of FIG. 1.

An embodiment of an improved handheld electronic device 4 in accordance with the disclosed concept is indicated generally in FIGS. 1 and 2. The handheld electronic device 4 includes a case 8, an input apparatus 12, an output apparatus 16, and a processor apparatus 20. The present exemplary embodiment of the handheld electronic device 4 includes applications and/or routines resident thereon such as, for example, and without limitation, a disambiguation routine and an e-mail client, although other and/or additional applications and/or routines, such as various messaging applications (e.g., without limitation, SMS or MMS) can be provided without departing from the concept disclosed herein.

Referring to FIG. 1, the input apparatus includes a keypad 24 that includes a plurality of keys 28. The input apparatus 12 additionally includes a track wheel 32 for additional input. Many of the keys 28 have one or more letters assigned thereto, and some of the keys 28 have a plurality of letters assigned thereto. In the present exemplary embodiment, the exemplary letters are Latin letters, and the exemplary Latin letters serve as linguistic elements for language entry into the handheld electronic device 4. It is understood that while the linguistic elements of the instant exemplary embodiment are depicted as being characters, specifically Latin letters, the linguistic elements could be other elements such as, for example and without limitation, other types of characters, ideograms, portions of ideograms such as strokes, and other elements that can be used in the generation of language. The expressions "text" and "word", and variations thereof, are to be broadly construed herein and are not intended to be limiting in any fashion with regard to a particular language, a particular portion of a language or a means of providing an expression in a language, or to a particular language type or format.

The output apparatus 16 in the present exemplary embodiment includes a display 36. The output apparatus 16 may additionally include other output devices such as lights, speakers, and other output devices without limitation.

As can be seen in FIG. 2, the processor apparatus 20 includes a processor which may be, for instance and without limitation, a microprocessor (μP) 40 and which is responsive to inputs from the input apparatus 12 and provides output signals to the output apparatus 16. The processor apparatus 20 additionally includes a memory 44 with which the microprocessor 40 interfaces. The memory 44 can be any of a variety of storage devices such as, for example and without limitation, RAM, ROM, EPROM, EEPROM, and/or other devices. In the exemplary embodiment, the memory 44 stores a number of routines executable by the microprocessor 40, such as, without limitation, a disambiguation routine as described elsewhere herein.

Although many uses for the disclosed concept will be apparent, one exemplary use is presented herein as being in the context of electronic mail, in which case the memory 44 will also store an email client (one or more software routines) executable by the microprocessor 40. As can be seen in FIG. 3, for example, a number of existing messages 52 are available on the handheld electronic device 4. That is, the messages 52 may either be stored directly on the handheld electronic device 4 or may be downloadable on demand, for example. The exemplary messages 52 in FIG. 3 each include, for instance, a sender 56 and a subject 60 for reference by the user.

In a situation where, for example, a user enters a replying or forwarding command with respect to one of the messages 52, the user may wish to enter certain words that were included in the message thread of which the message 52 is part (note, message 52 may be the only message in the thread, or, alternatively, one or more additional messages may be included in the message thread). The concept disclosed herein provides a method that may be implemented on the handheld electronic device 4 (or another device) in which a user is provided with assisted entry of text when replying to or forwarding an email message 52 based on the words that are included in the message thread that includes the email message 52.

Figure 4:
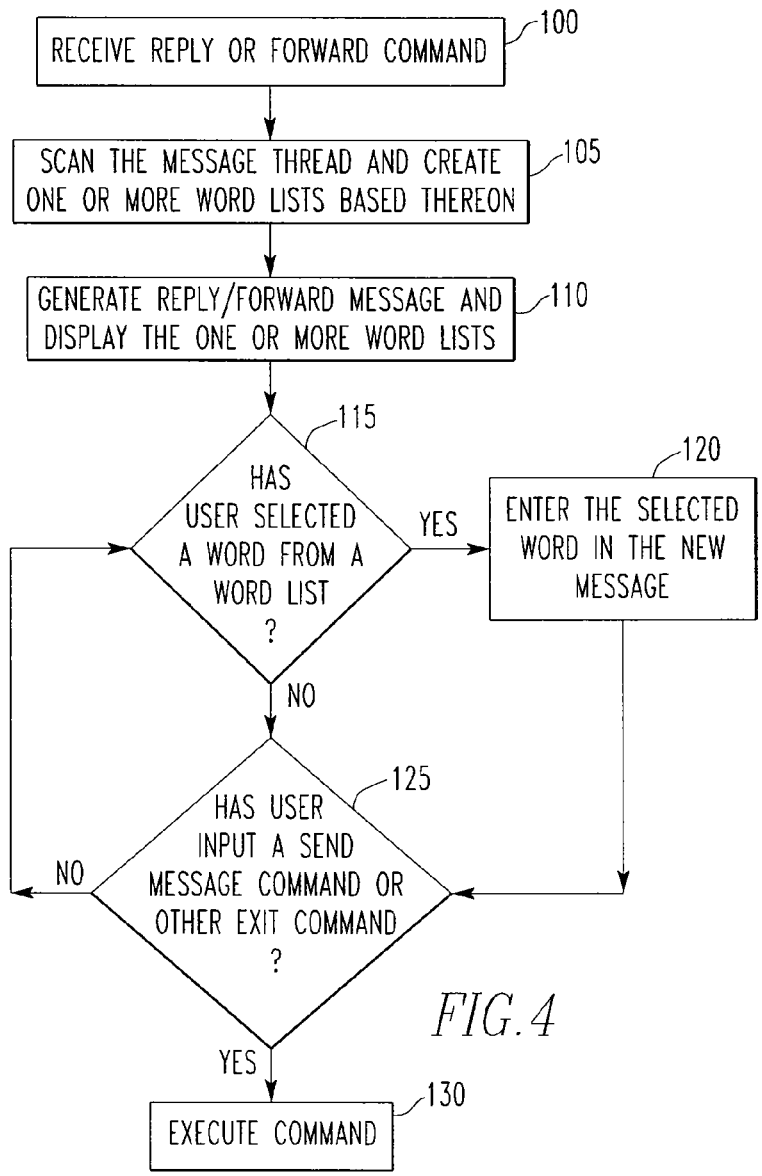
FIG. 4 is flowchart illustrating a method of facilitating the input of text into a new message according to an embodiment of the concept disclosed herein.

Referring to FIG. 4, the method begins at step 100, wherein the user enters and the processor apparatus 20 of the handheld electronic device 4 receives, in a known manner such as through a menu selection, a command to reply to or forward an email message 52, such as the email message 52 shown in FIG. 5. As seen in FIG. 5, the email message 52 includes a sender 56, a subject 60 and a message body 62. Although not shown in FIG. 5, it should be appreciated that email message 52 may be part of a message thread that includes more than just one message (i.e., more than just the email message 52), in which case information from the other emails in the message thread will typically follow the message body 62 shown in FIG. 5. Next, at step 105, the processor apparatus 20 scans the message thread that includes the email message 52 and creates one or more word lists from the words contained in the message thread. The word lists typically comprise one or more categories into which the identified words may be classified. As will be appreciated, this may be done in any number of ways. For example, in one embodiment, the processor apparatus 20 first scans the message thread and identifies all words having more than a predetermined number of characters, such as three characters. The processor apparatus 20 then classifies each identified word (having more than three characters) according to whether the word is a noun or a verb (or some other grammatical classification), and then as to whether the word exceeds a predetermined length, e.g., six characters. In this embodiment, it will be appreciated that a particular word may appear on more than one list (a seven character long verb will appear on two lists, the "verb" list and the "long words" list). In addition, in order to classify an identified word as a noun or verb (or some other grammatical classification), the word may be compared to dictionary information, for example in the form of a look-up table, stored in the memory 44. In an alternate embodiment, a single word list is created consisting of words that exceed a predetermined length, such as six characters. As will be appreciated by those skilled in the art, many other alternatives are also possible without departing from the scope of the disclosed concept.

Next, at step 110, a new email message (a reply or forward message) is created and the one or more lists created in step 105 are displayed to the user on the display 36 in connection with the new email message. For example, FIG. 6 shows such a new email message 64 in which the one or more lists created in step 105 are displayed in a word list window 66 provided on the display 36. FIG. 6 shows the embodiment wherein the identified words are classified as noun or verb and based on exceeding a certain length. It should be understood that this is meant to be exemplary only, and that other embodiments are also possible. As also seen in FIG. 6, the new email message 64 includes a message body 68 in which a user may enter text in a conventional manner using the input apparatus 12. As will be appreciated, this text entry may be facilitated using the disambiguation system (or some other keystroke interpretation system) implemented by the handheld electronic device 4. According to an aspect of the disclosed concept, the one or more lists created in step 105 are displayed in a manner that enables the user to select one of the words listed in the one or more lists using the input apparatus 12 and have that word be entered in the message body 68 at the location of the cursor 70. For example, as shown in FIG. 6, a user may select a word from the "Nouns" list by simultaneously pressing the ALT key 72 (FIG. 1) and the appropriate number that identifies the desired word. Similarly, a user may select a word from the "Verbs" list by simultaneously pressing the SHIFT key 74 (FIG. 1) and the appropriate number that identifies the desired word, or a word from the "Long" list by simultaneously pressing the Function key 76 (designated with the characters "SYM" in FIG. 1) and the appropriate number that identifies the desired word.

Figure 15:
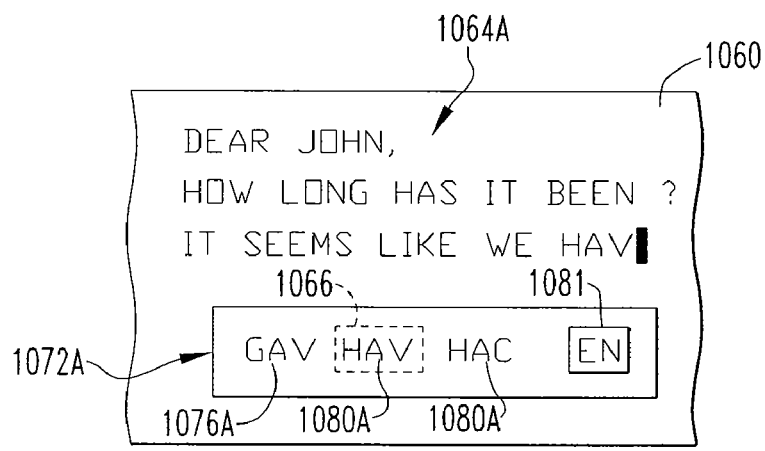
FIG. 15 is an alternative exemplary output during a text entry operation.

Referring again to FIG. 4, following step 110, the method proceeds to step 115, wherein a determination is made as to whether the user, through the input apparatus 12, has selected a word from one of the one or more lists displayed in step 110 in the word list window 66. If the answer at step 115 is yes, then, at step 120, the selected word is entered in the message body 68 at the location of the cursor 70. FIG. 7 shows the new email message 64 after the user has caused the word "jerseys" to be entered in the message body 68 by pressing "Function-4" on the input apparatus 12. Following step 120, the method proceeds to step 125, where a determination is made as to whether the user has input a send message command or another exit command. If the answer at step 125 is yes, then, at step 130, the command is executed. If, however, the answer at step 125 is no, then the method returns to step 115 for further processing as described herein. As seen in FIG. 15, if the answer at step 115 is no, then the method proceeds to step 125 and processing proceeds as described above.

Thus, the method shown in FIG. 4 enables the user of the handheld electronic device 4 to more easily enter text when responding to or forwarding an email message, such as an email message 52, by providing for the selection and entry of words derived from the message thread that includes the message being replied to or forwarded. Various manners of initiating the method shown in FIG. 4 during use of the handheld electronic device 4 are possible. In one embodiment, the method shown in FIG. 4 is automatically initiated whenever a user replies to or forwards an email message. In another embodiment, the method shown in FIG. 4 is initiated only when a user replies to or forwards an email message using a special reply or forward command, such as a "reply with word list" or "forward with word list" command selected from a menu in a known manner. In still another embodiment, the method may be initiated in the middle of replying to or forwarding an email message by making a particular menu selection, such as a "display word list" menu selection, in a known manner or by otherwise entering a predetermined command using the input apparatus, such as by pressing a particular combination of keys 26. In such a case, after the menu selection or command, the word lists described herein may be created and the word list window 66 may be displayed on the display 36.

In an alternative embodiment, the one or more lists created in step 105 are saved in the memory 44 in connection with the sender 56 (i.e., the sender of the message 52 in the message thread on which the one or more words lists were based). When the user of the handheld electronic device 4 sends another message to that same user at some later time, the one or more word lists that were saved in the memory 44 may be made available to the user in a word list window 66 so that the user can select one or more words therefrom in the manner described elsewhere herein for inclusion in the text of the message being created. As a further alternative, the one or more words lists may be backed up/saved on another electronic device, such as a separate PC, for archiving purposes. The archived word lists may later be accessed for use as described herein.

In a further embodiment, the processor apparatus 20 is adapted to generate, store and maintain/update a list of a predetermined number of words that have been determined to have been used most frequently by the user of the handheld electronic device in creating email messages over a predetermined period of time (a so called "My Wordlist" feature). The predetermined number of words may be any number, such as a reasonably manageable number like fifteen or twenty words. Preferably, although not necessarily, the words that are considered for inclusion on the most frequently used words list may be limited to only those words having at least a predetermined number of characters, such as four or more characters. In addition, the predetermined period of time may be any period, such as, without limitation, a period beginning at the initiation of use of the handheld electronic device 4 by the user and extending to the present or a period beginning at a list reset time (set by the user) and extending to the present.

Figure 8:
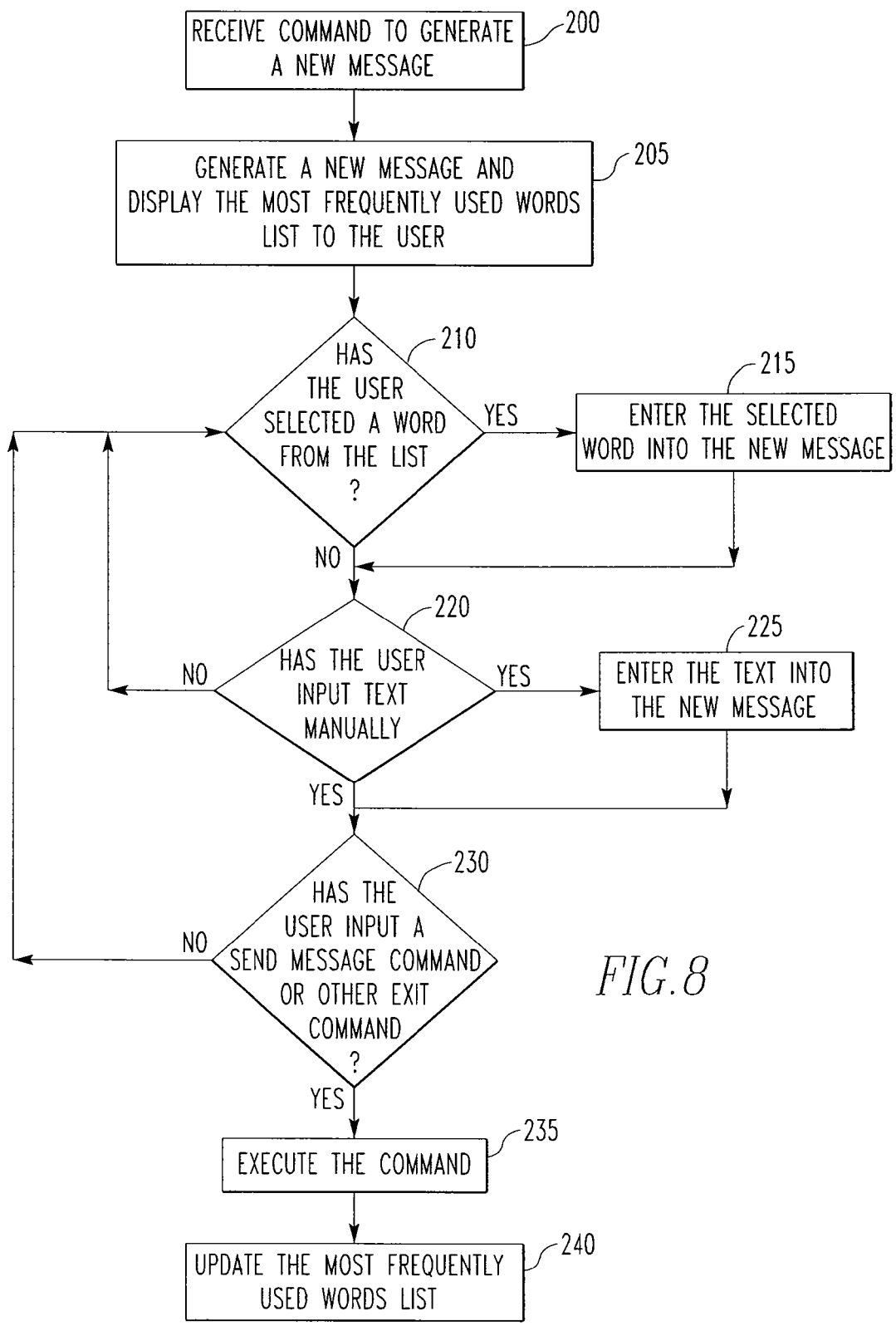
FIG. 8 is a flowchart showing a method of implementing a most frequently used words list in accordance with a further aspect of the concept disclosed herein.

FIG. 8 is a flowchart showing a method of implementing a most frequently used words list as described above on the handheld electronic device 4 according to one embodiment. The method begins at step 200, wherein the user enters and the processor apparatus 20 of the handheld electronic device 4 receives, in a known manner such as through a menu selection, a command to generate a new email message. Next, at step 205, a new email message is created and the most frequently used words list stored by the processor apparatus 20, and in particular the memory 44, is displayed to the user on the display 36 (e.g., in a window similar to word list window 66) in connection with the new email message. According to an aspect of the disclosed concept, the most frequently used words list is displayed in a manner that enables the user to select one of the words listed therein using the input apparatus 12 and have that word be entered in the message body of the new email message. For example, the words on the most frequently used words list may be numbered sequentially, and a user may select a word from the most frequently used words list by simultaneously pressing a predetermined key 26, such as the ALT key 72 or the SHIFT key 74 (FIG. 1), and the number that identifies the desired word. The words on the most frequently used words list may also be categorized as described elsewhere herein (e.g., nouns, verbs, long), and may be selected from the appropriate category in the manner described elsewhere herein.

Following step 205, the method proceeds to step 210, wherein a determination is made as to whether the user, through the input apparatus 12, has selected a word from the most frequently used words list. If the answer at step 210 is yes, then, at step 215, the selected word is entered in the message body of the new email message at the location of the cursor therein. Following step 215, or if the answer at step 210 is no, the method proceeds to step 220 where a determination is made as to whether the user has manipulated the input apparatus 12 to input text manually. If the answer is yes, then, at step 225, the manually input text is entered in the message body of the new email message at the location of the cursor therein.

Following step 225, or if the answer at step 220 is no, the method proceeds to step 230, where a determination is made as to whether the user has input a send message command or another exit command. If the answer at step 230 is no, then the method returns to step 210 for further processing. However, if the answer at step 230 is yes, then, at step 235, the command is executed. Next, at step 240, the most frequently used words list is updated based on the contents of the new email message just generated, and preferably only if the email is actually sent. To implement this step, the processor apparatus 20 may maintain a database of word usage that tracks the frequency of use of all words that are eligible for inclusion on the most frequently used words list (e.g., all words longer than say four characters). Each time a new email is sent (see step 235), the eligible words in that email message are extracted and their use is recorded in the database. Based on this use, the relative frequencies of all of the words therein may be determined/adjusted, and the top (most frequent) predetermined number of words is selected for inclusion on the updated most frequently used words list. Once updated, the most frequently used words list is stored for use in step 205 as needed. It will be understood that this is just one particular implementation of updating the most frequently used words list and that other implementations are also possible without departing from the scope of the present concept.

Figure 9:
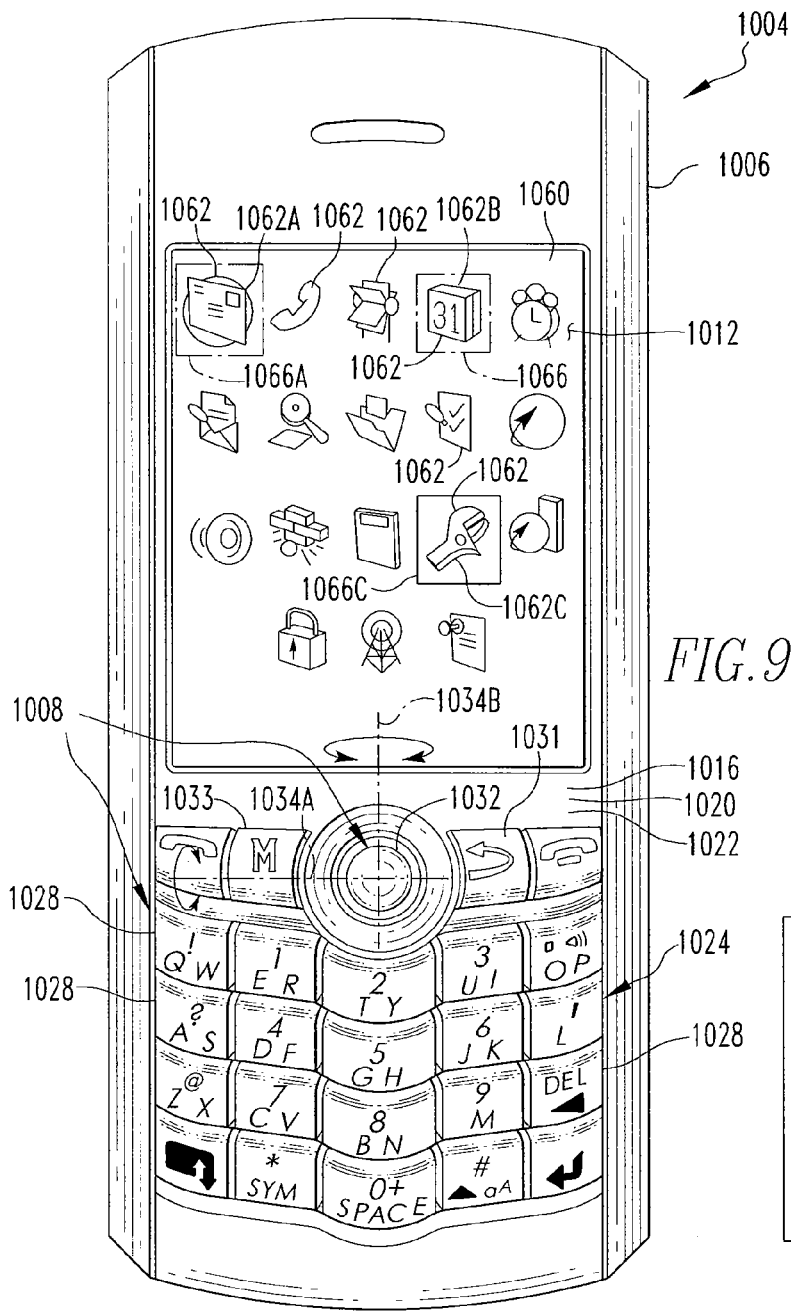
FIG. 9 is a top plan view of an improved handheld electronic device in accordance with another embodiment of the disclosed and claimed concept.

An improved handheld electronic device 1004 in accordance with another embodiment of the disclosed and claimed concept is depicted generally in FIG. 9. As a general matter, the handheld electronic device 1004 is substantially identical in configuration and function to the handheld electronic device 4, except that the handheld electronic device 1004 employs a multiple-axis input device instead of or in addition to the track wheel 32. In the depicted exemplary embodiment, the multiple-axis input device is a track ball 1032 as will be described below. It is noted, however, that multiple-axis input devices other than the track ball 1032 can be employed without departing from the present concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The handheld electronic device 1004 includes a housing 1006 upon which is disposed a processor unit that includes an input apparatus 1008, an output apparatus 1012, a processor 1016, a memory 1020, and a number of routines 1022. All of the operations that can be performed on or with the handheld electronic device 4 can be performed on or with the handheld electronic device 1004. As such, the features of the bandheld electronic device 4 that are common with the handheld electronic device 1004, and this would comprise essentially all of the features of the handheld electronic device 4, will generally not be repeated.

The output apparatus 1012 includes a display 1060 that provides visual output. The exemplary output in FIG. 9 is a plurality of icons 1062 that are selectable by the user for the purpose of, for example, initiating the execution on the processor 1016 of a routine 1022 that is represented by an icon 1062.

The input apparatus 1008 can be said to comprise a keypad 1024 and the track ball 1032, all of which serve as input members. The keypad 1024 and the track ball 1032 are advantageously disposed adjacent one another. The keypad 1024 comprises a plurality of keys 1028 that are actuatable to provide input to the processor 1016. Many of the keys 1028 have assigned thereto a plurality of linguistic elements in the exemplary form of Latin letters. Other keys 1028 can have assigned thereto functions and/or other characters.

For instance, one of the keys 1028 is an <ESCAPE> key 1031 which, when actuated, provides to the processor 1016 an input that undoes the action which resulted from the immediately preceding input and/or moves the user to a logically higher position within the logical menu tree managed by a graphical user interface (GUI) routine 1022. The function provided by the <ESCAPE> key 1031 can be used at any logical location within any portion of the logical menu tree except, perhaps, at a home screen such as is depicted in FIG. 9. The <ESCAPE> key 1031 is advantageously disposed adjacent the track ball 1032 thereby enabling, for example, an unintended or incorrect input from the track ball 1032 to be quickly undone, i.e., reversed, by an actuation of the adjacent <ESCAPE> key 1031.

Figure 10:
FIG. 10 depicts an exemplary menu that can be output on the handheld electronic device of FIG. 9.
Figure 11:
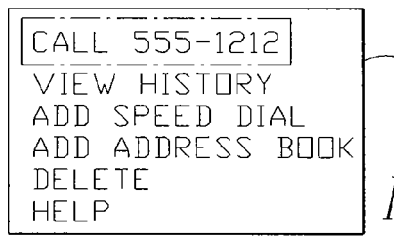
FIG. 11 depicts another exemplary menu.

Another of the keys 1028 is a <MENU> key 1033 which, when actuated, provides to the processor 1016 an input that causes the GUI 1022 to generate and output on the display 1060 a menu that is appropriate to the user's current logical location within the logical menu tree. For instance, FIG. 10 depicts an exemplary menu 1035A that would be appropriate if the user's current logical location within the logical menu tree was viewing an email within an email routine 1022. That is, the menu 1035A provides selectable options that would be appropriate for a user given that the user is, for example, viewing an email within an email routine 1022. In a similar fashion, FIG. 11 depicts another exemplary menu 1035B that would be depicted if the user's current logical location within the logical menu tree was within a telephone routine 1022.

The track ball 1032 is disposed on the housing 1006 and is freely rotatable in all directions with respect to the housing 1006. A rotation of the track ball 1032 a predetermined rotational distance with respect to the housing 1006 provides an input to the processor 1016, and such inputs can be employed by the routines 1022, for example, as navigational inputs, scrolling inputs, selection inputs, and other inputs.

For instance, the track ball 1032 is rotatable about a horizontal axis 1034A to provide vertical scrolling, navigational, selection, or other inputs. Similarly, the track ball 1032 is rotatable about a vertical axis 1034B to provide horizontal scrolling, navigational, selection, or other inputs. Since the track ball 1032 is freely rotatable with respect to the housing 1006, the track ball 1032 is additionally rotatable about any other axis (not expressly depicted herein) that lies within the plane of the page of FIG. 9 or that extends out of the plane of the page of FIG. 9.

The track ball 1032 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 1032 is merely one of many multiple-axis input devices that could be employed on the handheld electronic device 1004. As such, mechanical alternatives to the track ball 1032, such as a joystick, might have a limited rotation with respect to the housing 1006, and non-mechanical alternatives might be immovable with respect to the housing 1006, yet all are capable of providing input in a plurality of directions or along a plurality of axes.

The track ball 1032 additionally is translatable toward the housing 1006, i.e., into the plane of the page of FIG. 9, to provide additional inputs. The track ball 1032 could be translated in such a fashion by, for example, a user applying an actuating force to the track ball 1032 in a direction toward the housing 1006, such as by pressing on the track ball 1032. The inputs that are provided to the processor 1016 as a result of a translation of the track ball 1032 in the indicated fashion can be employed by the routines 1022, for example, as selection inputs, delimiter inputs, or other inputs.

The track ball 1032 is rotatable to provide, for example, navigational inputs among the icons 1062. For example, FIG. 9 depicts the travel of an indicator 1066 from the icon 1062A, as is indicated in broken lines with the indicator 1066A, to the icon 1062B, as is indicated in broken lines with the indicator 1066B, and onward to the icon 1062C, as is indicated by the indicator 1066C. It is understood that the indicators 1066A, 1066B, and 1066C are not necessarily intended to be simultaneously depicted on the display 1060, but rather are intended to together depict a series of situations and to indicate movement of the indicator 1066 among the icons 1062. The particular location of the indicator 1066 at any given time indicates to a user the particular icon 1062, for example, that is the subject of a selection focus of the handheld electronic device 1004. Whenever an icon 1062 or other selectable object is the subject of the selection focus, a selection input to the processor 1016 will result in the routine 1022 or other function represented by the icon 1062 or other selectable object to be executed or initiated.

The movement of the indicator 1066 from the icon 1062A, as indicated with the indicator 1066A, to the icon 1062B, as is indicated by the indicator 1066B, was accomplished by rotating the track ball 1032 about the vertical axis 1034B to provide a horizontal navigational input. As mentioned above, a rotation of the track ball 1032 a predetermined rotational distance results in an input to the processor 1016. In the present example, the track ball 1032 would have been rotated about the vertical axis 1034B a rotational distance equal to three times the predetermined rotational distance since the icon 1062B is disposed three icons 1062 to the right the icon 1062A. Such rotation of the track ball 1032 likely would have been made in a single motion by the user, but this need not necessarily be the case.

Similarly, the movement of the indicator 1066 from the icon 1062B, as indicated by the indicator 1066B, to the icon 1062C, as is indicated by the indicator 1066C, was accomplished by the user rotating the track ball 1032 about the horizontal axis 1034A to provide a vertical navigational input. In so doing, the track ball 1032 would have been rotated a rotational distance equal to two times the predetermined rotational distance since the icon 1062C is disposed two icons 1062 below the icon 1062B. Such rotation of the track ball 1032 likely would have been made in a single motion by the user, but this need not necessarily be the case.

It thus can be seen that the track ball 1032 is rotatable in various directions to provide various navigational and other inputs to the processor 1016. Rotational inputs by the track ball 1032 typically are interpreted by whichever routine 1022 is active on the handheld electronic device 1004 as inputs that can be employed by such routine 1022. For example, the GUI 1022 that is active on the handheld electronic device 1004 in FIG. 9 requires vertical and horizontal navigational inputs to move the indicator 1066, and thus the selection focus, among the icons 1062. If a user rotated the track ball 1032 about an axis oblique to the horizontal axis 1034A and the vertical axis 1034B, the GUI 1022 likely would resolve such an oblique rotation of the track ball 1032 into vertical and horizontal components which could then be interpreted by the GUI 1022 as vertical and horizontal navigational movements, respectively. In such a situation, if one of the resolved vertical and horizontal navigational movements is of a greater magnitude than the other, the resolved navigational movement having the greater magnitude would be employed by the GUI 1022 as a navigational input in that direction to move the indicator 1066 and the selection focus, and the other resolved navigational movement would be ignored by the GUI 1022, for example.

The ability of the track ball 1032 to provide multiple-axis inputs is particularly advantageous when used in conjunction with the word list window 66, such as is depicted in FIG. 6 and which can be output on the display 1060 of the handheld electronic device 1004. For example, a user could rotate the track ball 1032 in the horizontal direction in order to provide scrolling inputs and to scroll horizontally among the various lists, i.e., the "NOUNS" list, the "VERBS" list, and the "LONG" list. Once the user has arrived at the desired list, the user can scroll the track ball 1032 in the vertical direction to provide additional scrolling inputs and scroll among the words in the list. Any combination of scrolling inputs, i.e., rotational inputs from the track ball 1032, can be used to arrive at whatever word in the word list window 66 is desired to be selected. The user can then actuate the track ball 1032, i.e., translate the track ball 1032 toward the housing 1006, in order to provide a selection input with respect to the word and to thereby select it. The track ball 1032 therefore provides the functions of the ALT key 72, the SHIFT key 74, and the Function key 76 of the handheld electronic device 4 in this respect.

When the indicator 1066 is disposed on the icon 1062C, as is indicated by the indicator 1066C, the selection focus of the handheld electronic device 1004 is on the icon 1062C. As such, a translation of the track ball 1032 toward the housing 1006 as described above would provide an input to the processor 1016 that would be interpreted by the GUI 1022 as a selection input with respect to the icon 1062C. In response to such a selection input, the processor 1016 would, for example, begin to execute a routine 1022 that is represented by the icon 1062C. It thus can be understood that the track ball 1032 is rotatable to provide navigational and other inputs in multiple directions, assuming that the routine 1022 that is currently active on the handheld electronic device 1004 can employ such navigational or other inputs in a plurality of directions, and can also be translated to provide a selection input or other input.

Rotational movement inputs from the track ball 1032 could be employed to navigate among, for example, the menus 1035A and 1035B. For instance, after an actuation of the <MENU> key 1033 and an outputting by the GUI 1022 of a resultant menu, the user could rotate the track ball 1032 to provide scrolling inputs to successively highlight the various selectable options within the menu. Once the desired selectable option is highlighted, i.e., is the subject of the selection focus, the user could translate the track ball 1032 toward the housing 1006 to provide a selection input as to the highlighted selectable option. In this regard, it is noted that the <MENU> key 1033 is advantageously disposed adjacent the track ball 1032. This enables, for instance, the generation of a menu by an actuation the <MENU> key 1033, conveniently followed by a rotation the track ball 1032 to highlight a desired selectable option, for instance, followed by a translation of the track ball 1032 toward the housing 1006 to provide a selection input to initiate the operation represented by the highlighted selectable option.

It is further noted that one of the additional inputs that can be provided by a translation of the track ball 1032 is an input that causes the GUI 1022 to output a reduced menu. For instance, a translation of the track ball 1032 toward the housing 1066 could result in the generation and output of a more limited version of a menu than would have been generated if the <MENU> key 1033 had instead been actuated. Such a reduced menu would therefore be appropriate to the user's current logical location within the logical menu tree and would provide those selectable options which the user would have a high likelihood of selecting. Rotational movements of the track ball 1032 could provide scrolling inputs to scroll among the selectable options within the reduced menu 1035C, and translation movements of the track ball 1032 could provide selection inputs to initiate whatever function is represented by the selectable option within the reduce menu 1032 that is currently highlighted.

Figure 12:
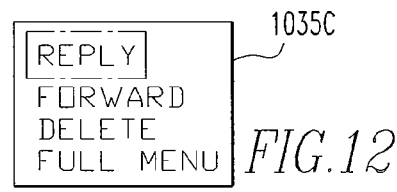
FIG. 12 depicts an exemplary reduced menu.

By way of example, if instead of actuating the <MENU> key 1033 to generate the menu 1035A the user translated the track ball 1032, the GUI 1022 would generate and output on the display the reduced menu 1035C that is depicted generally in FIG. 12. The exemplary reduced menu 1035C provides as selectable options a number of the selectable options from the menu 1035A that the user would be most likely to select. As such, a user seeking to perform a relatively routine function could, instead of actuating the <MENU> key 1033 to display the full menu 1035A, translate the track ball 1032 to generate and output the reduced menu 1035C. The user could then conveniently rotate the track ball 1032 to provide scrolling inputs to highlight a desired selectable option, and could then translate the track ball 1032 to provide a selection input which would initiate the function represented by the selectable option in the reduced menu 1035C that is currently highlighted.

In the present exemplary embodiment, many of the menus that could be generated as a result of an actuation of the <MENU> key 1033 could instead be generated and output in reduced form as a reduced menu in response to a translation of the track ball 1032 toward the housing 1006. It is noted, however, that a reduced menu might not be available for each full menu that could be generated from an actuation of the <MENU> key 1033. Depending upon the user's specific logical location within the logical menu tree, a translation of the track ball 1032 might be interpreted as a selection input rather than an input seeking a reduced menu. For instance, a translation of the track ball 1032 on the home screen depicted in FIG. 9 would result in a selection input as to whichever of the icons 1062 is the subject of the input focus. If the <MENU> key 1033 was actuated on the home screen, the GUI 1022 would output a menu appropriate to the home screen, such as a full menu of all of the functions that are available on the handheld electronic device 1004, including those that might not be represented by icons 1062 on the home screen.

Figure 13:
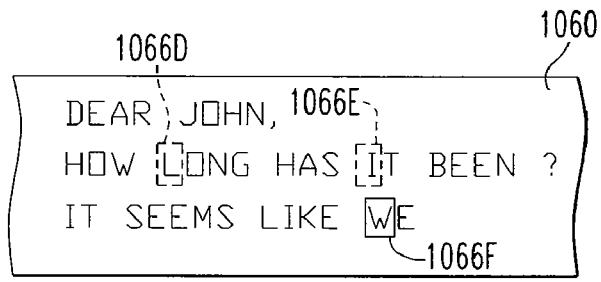
FIG. 13 is an exemplary output such as could occur during a text entry or text editing operation.

FIG. 13 depicts a quantity of text that is output on the display 1060, such as during a text entry operation or during a text editing operation, for example. The indicator 1066 is depicted in FIG. 13 as being initially over the letter "L", as is indicated with the indicator 1066D, and having been moved horizontally to the letter "I", as is indicated by the indicator 1066E, and thereafter vertically moved to the letter "W", as is indicated by the indicator 1066F. In a fashion similar to that in FIG. 9, the cursor 1066 was moved among the letters "L", "I", and "W" through the use of horizontal and vertical navigational inputs resulting from rotations of the track ball 1032. In the example of FIG. 13, however, each rotation of the track ball 1032 the predetermined rotational distance would move the indicator 1066 to the next adjacent letter. As such, in moving the indicator 1066 between the letters "L" and "I," the user would have rotated the track ball 1032 about the vertical axis 1034B a rotational distance equal to nine times the predetermined rotational distance, for example, since "I" is disposed nine letters to the right of "L".

Figure 14:
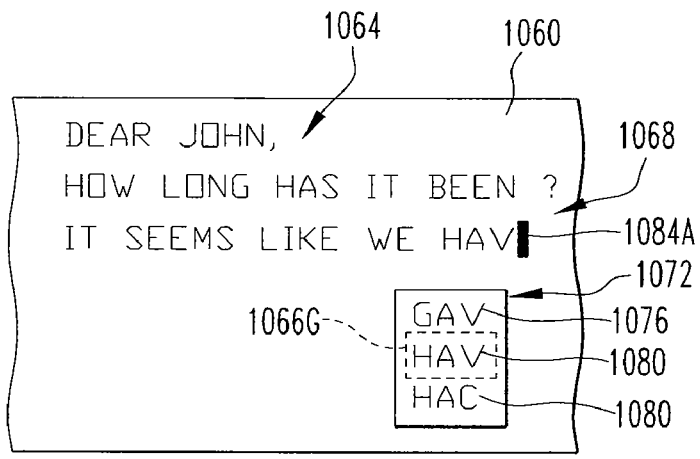
FIG. 14 is an exemplary output during a text entry operation.

FIG. 14 depicts an output 1064 on the display 1060 during, for example, a text entry operation that employs the disambiguation routine 1022. The output 1064 can be said to comprise a text component 1068 and a variant component 1072. The variant component 1072 comprises a default portion 1076 and a variant portion 1080. FIG. 14 depicts the indicator 1066G on the variant 1080 "HAV", such as would result from a rotation of the track ball 1032 about the horizontal axis 1034A to provide a downward vertical scrolling input. In this regard, it is understood that a rotation of the track ball 1032 a distance equal to the predetermined rotational distance would have moved the indicator 1066 from a position (not expressly depicted herein) disposed on the default portion 1076 to the position disposed on the first variant 1080, as is depicted in FIG. 14. Since such a rotation of the track ball 1032 resulted in the first variant 1080 "HAV" being highlighted with the indicator 1066G, the text component 1068 likewise includes the text "HAV" immediately preceding a cursor 1084A.

FIG. 15 depict an alternative output 1064A having an alternative variant component 1072A having a default portion 1076A and a variant portion 1080A. The variant component 1072A is horizontally arranged, meaning that the default portion 1076A and the variants 1080A are disposed horizontally adjacent one another and can be sequentially selected by the user through the use of horizontal scrolling inputs, such as by the user rotating the track ball 1032 the predetermined rotational distance about the vertical axis 1034B. This is to be contrasted with the variant component 1072 of FIG. 14 wherein the default portion 1076 and the variants 1080 are vertically arranged, and which can be sequentially selected by the user through the user of vertical scrolling inputs with the track ball 1032.

In this regard, it can be understood that the track ball 1032 can provide both the vertical scrolling inputs employed in conjunction with the output 1064 as well as the horizontal scrolling inputs employed in conjunction with the output 1064A. For instance, the disambiguation routine 1022 potentially could allow the user to customize the operation thereof by electing between the vertically arranged variant component 1072 and the horizontally arranged variant component 1072A. The track ball 1032 can provide scrolling inputs in the vertical direction and/or the horizontal direction, as needed, and thus is operable to provide appropriate scrolling inputs regardless of whether the user chooses the variant component 1072 or the variant component 1072A. That is, the track ball 1032 can be rotated about the horizontal axis 1034A to provide the vertical scrolling inputs employed in conjunction with the variant component 1072, and also can be rotated about the vertical axis 1034B to provide the horizontal scrolling inputs that are employed in conjunction with the variant component 1064A. The track ball 1032 thus could provide appropriate navigational, strolling, selection, and other inputs depending upon the needs of the routine 1022 active at any time on the handheld electronic device 1004. The track ball 1032 enables such navigational, strolling, selection, and other inputs to be intuitively generated by the user through rotations of the track ball 1032 in directions appropriate to the active routine 1022, such as might be indicated on the display 1060. Other examples will be apparent.

It can further be seen from FIG. 15 that the variant component 1072A additionally includes a value 1081 that is indicative of the language into which the disambiguation routine 1022 will interpret ambiguous text input. In the example depicted in FIG. 15, the language is English.

Figure 16:
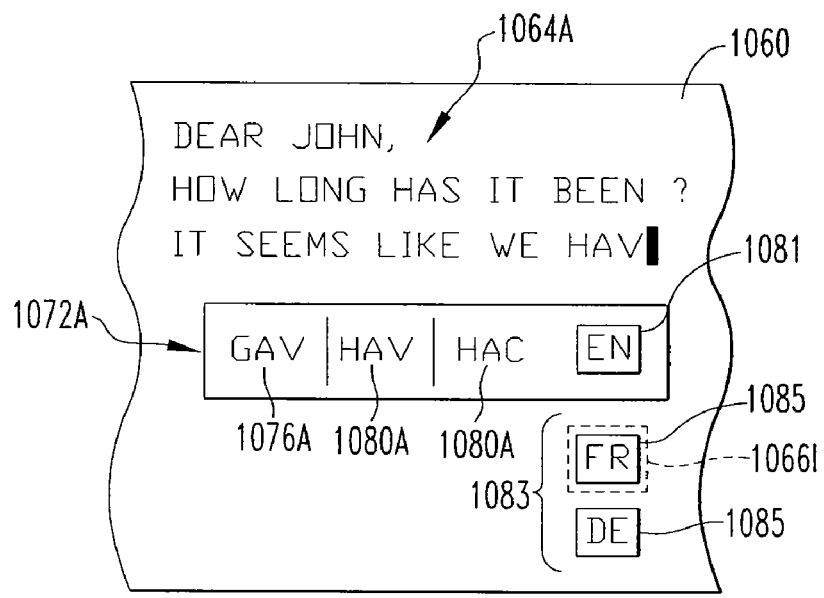
FIG. 16 is another exemplary output during a part of text entry operation.

As can be seen in FIG. 16, the value 1081 can be selected by the user to cause the displaying of a list 1083 of alternative values 1085. The alternative values 1085 are indicative of selectable alternative languages into which the disambiguation routine 1022 can interpret ambiguous input. A selection of the value 1081 would have been achieved, for example, by the user providing horizontal scrolling inputs with the track ball 1032 to cause (not expressly depicted herein) the indicator 1066 to be disposed over the value 1081, and by thereafter translating the track ball 1032 toward the housing 1006 to provide a selection input.

The alternative values 1085 in the list 1083 are vertically arranged with respect to one another and with respect to the value 1081. As such, a vertical scrolling input with the track ball 1032 can result in a vertical movement of the indicator 10661 to a position on one of the alternative values 1085 which, in the present example, is the alternative value 1085 "FR", which is representative of the French language. The alternative value 1085 "FR" could become selected by the user in any of a variety of fashions, such as by actuating the track ball 1032 again, by continuing to enter text, or in other fashions. It thus can be understood from FIG. 15 and FIG. 16 that the track ball 1032 can be rotated to provide horizontal scrolling inputs and, when appropriate, to additionally provide vertical scrolling inputs and, when appropriate, to additionally provide selection inputs, for example.

Figure 17:
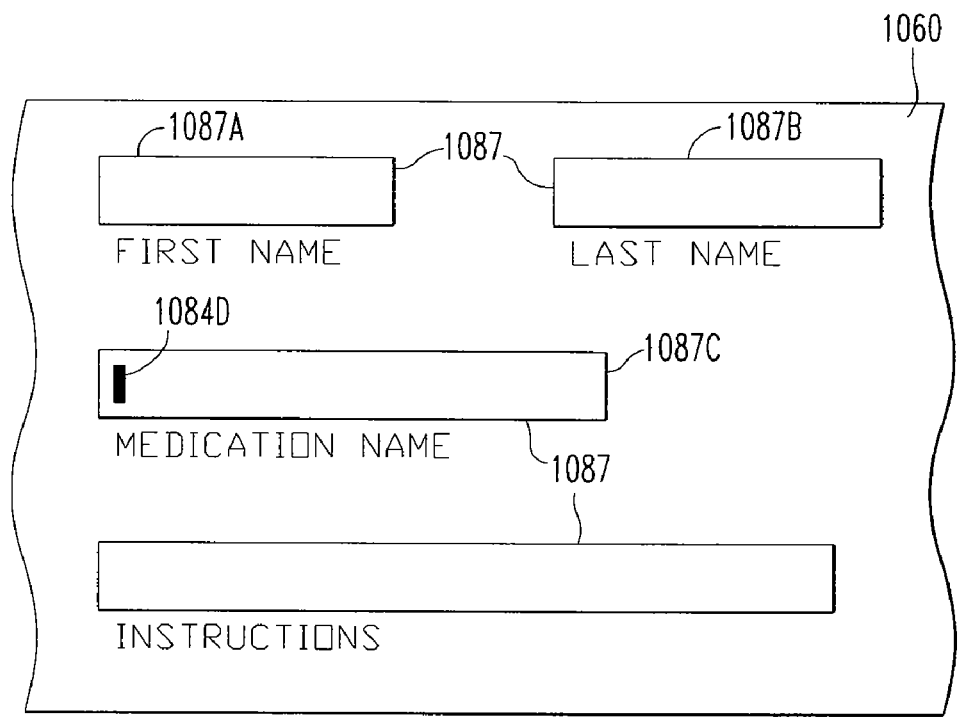
FIG. 17 is an exemplary output during a data entry operation.

FIG. 17 depicts another exemplary output on the display 1060 such as might be employed by a data entry routine 1022. The exemplary output of FIG. 17 comprises a plurality of input fields 1087 with corresponding descriptions. A cursor 1084D, when disposed within one of the input fields 1087, indicates to the user that an input focus of the handheld electronic device 1004 is on that input field 1087. That is, data such as text, numbers, symbols, and the like, will be entered into whichever input field 1087 is active, i.e., is the subject of the input focus. It is understood that the handheld electronic device 1004 might perform other operations or take other actions depending upon which input field 1087 is the subject of the input focus.

Navigational inputs from the track ball 1032 advantageously enable the cursor 1084D, and thus the input focus, to be switched, i.e., shifted, among the various input fields 1087. For example, the input fields 1087 could include the input fields 1087A, 1087B, and 1087C. FIG. 17 depicts the cursor 1084D as being disposed in the input field 1087C, indicating that the input field 1087C is the subject of the input focus of the handheld electronic device 1004. It is understood that the cursor 1084D, and thus the input focus, can be shifted from the input field 1087C to the input field 1087A, which is disposed adjacent and vertically above the input field 1087C, by providing a vertical scrolling input in the upward direction with the track ball 1032. That is, the track ball 1032 would be rotated the predetermined rotational distance about the horizontal axis 1034. Similarly, the cursor 1084D, and thus the input focus, can be shifted from the input field 1087A to the input field 1087B, which is disposed adjacent and to the right of the input field 1087A, by providing a horizontal scrolling input to the right with the track ball 1032. That is, such a horizontal scrolling input could be provided by rotating the track ball the predetermined rotational distance about the vertical axis 1034B. It thus can be seen that the track ball 1032 is rotatable in a plurality of directions about a plurality axes to provide navigational, scrolling, and other inputs in a plurality of directions among a plurality of input fields 1087. Other types of inputs and/or inputs in other applications will be apparent.

Since the keypad 1024 and the track ball 1032 are advantageously disposed adjacent one another, the user can operate the track ball 1032 substantially without moving the user's hands away from the keypad 1024 during a text entry operation or other operation. It thus can be seen that the track ball 1032 combines the benefits of both the track wheel 32 and the <NEXT> key 40. It is noted, however, that other embodiments of the handheld electronic device 1004 (not expressly depicted herein) could include both the track ball 1032 and a <NEXT> key such as the <NEXT> key 40 without departing from the present concept.

Figure 18:
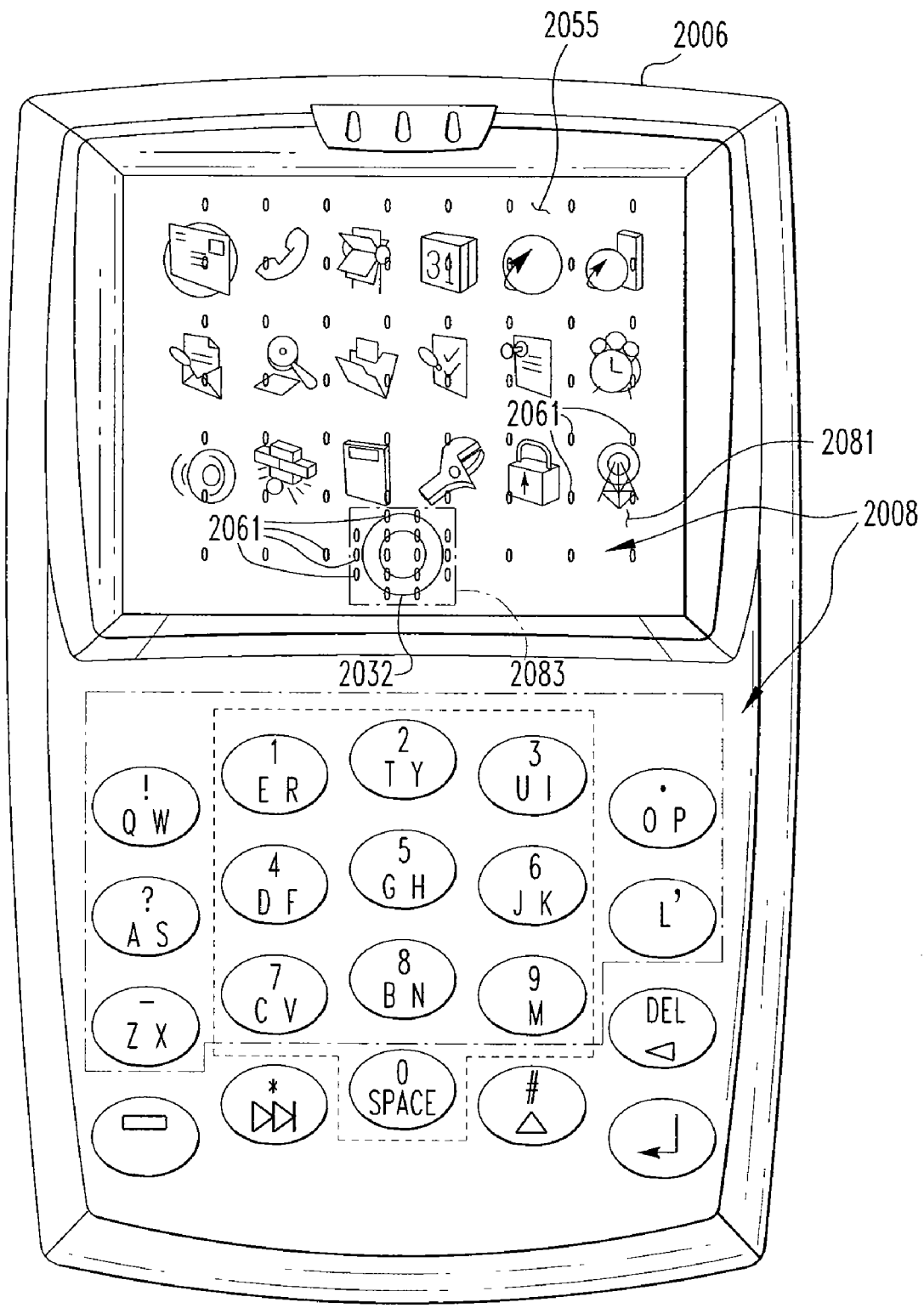
FIG. 18 is a top plan view of an improved handheld electronic device in accordance with still another embodiment of the disclosed and claimed concept.
Figure 19:
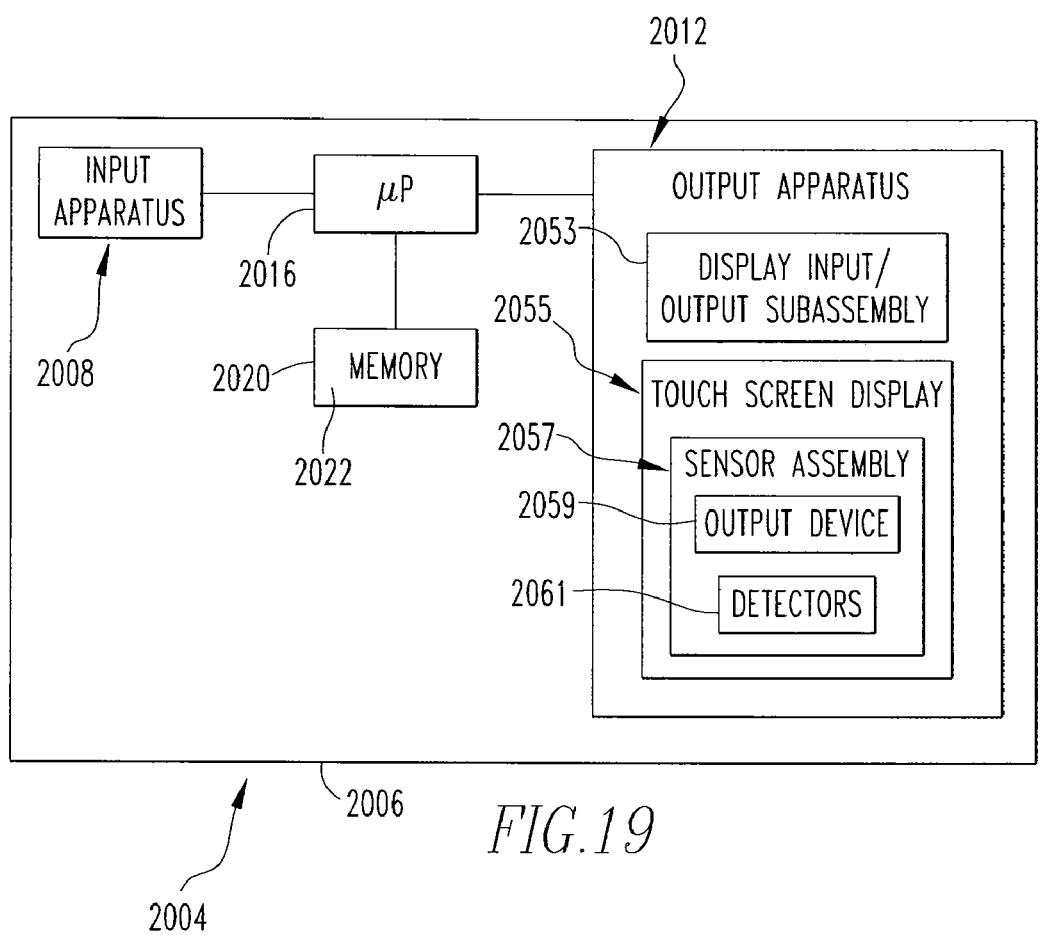
FIG. 19 is a schematic depiction of the improved handheld electronic device of FIG. 18.

An improved handheld electronic device 2004 in accordance with still another embodiment of the disclosed and claimed concept is depicted generally in FIG. 18 and FIG. 19. The handheld electronic device 2004 includes a housing 2006 upon which is disposed a processor unit that includes an input apparatus 2008, an output apparatus 2012, a processor 2016, a memory 2020, and a number of routines 2022. All of the operations that can be performed on or with the handheld electronic devices 4 and/or 1004 can be performed on or with the handheld electronic device 2004. As such, the features of the handheld electronic device 2004 that are common with the handheld electronic devices 4 and/or 1004, and this would comprise essentially all of the features of the handheld electronic devices 4 and/or 1004, will generally not be repeated.

As a general matter, the handheld electronic device 2004 is substantially identical in configuration and function to the handheld electronic device 1004, except that the handheld electronic device 2004 includes a touch screen display 2055 that provides a non-mechanical multiple-axis input device 2032 instead of the track ball 1032. The multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes thereby enabling the formation of images on the touch screen display 2055.

Additionally, the touch screen display 2055 comprises a sensor assembly 2057 which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus.

The detectors 2061 are typically capacitive detectors, optical detectors, resistive detectors, or mechanical detectors such as strain gauge or charged grid, although other technologies may be employed without departing from the present concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, i.e. as a result of being touched by the user, the columns at the area of compression contact the opposing grid thereby completing a circuit.

Capacitive detectors may be disposed upon either substrate and, although small, require space. Thus, and any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 18, the first area 2081 essentially is every region of the touch screen display 2005 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus is structured to create images and define the boundaries of selectable portions of the images on the touch screen display 2055. For example, the processor apparatus will create the images of selectable icons or other objects on specific portions of the touch screen display 2055. The processor apparatus is further structured to relate specific detectors 2061 to the specific portions of the touch screen display 2055. Thus, when the processor apparatus detects the actuation of a specific detector 2061 adjacent to a specific image, e.g. a selectable icon, the processor apparatus will initiate the function or routine related to that icon, e.g. opening a calendar program.

Similarly, the processor apparatus is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus as an actuation input of the virtual track ball 2032, such as would be generated by an actuation of the track ball 1032 of the handheld electronic device 1004 in a direction toward the housing 1006 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 1032 of the handheld electronic device 1004. It is understood that the virtual track ball 2032 is but one example of the many types of multiple-axis input devices that could be employed on the handheld electronic device 2004.

While specific embodiments of the invention have been described in detail, it will be appreciated by those skilled in the art that various modifications and alternatives to those details could be developed in light of the overall teachings of the disclosure. For example, the concept disclosed herein has, for illustrative purposes, been described in connection with email messages and an email application. It should be appreciated, however, that other types of messages and messaging application may be involved, such as, without limitation, SMS, MMS, and instant messaging. Accordingly, the particular arrangements disclosed are meant to be illustrative only and not limiting as to the scope of the invention which is to be given the full breadth of the claims appended and any and all equivalents thereof.

What is claimed is:

1. A method of facilitating the entry of text into a new message generated by a messaging application of a handheld electronic device that includes a multiple-axis input device, the method comprising:
   receiving a command to reply to or forward a received message, said received message being included within a message thread;
   scanning said message thread and identifying a plurality of words in said message thread;
   generating one or more word lists that include said words;
   displaying said one or more word lists;
   detecting an input from the multiple-axis input device as a selection of a selected one of said words from said one or more word lists; and
   entering said selected one of said words into said new message.

2. The method according to claim 1, wherein said one or more word lists comprise a plurality of word lists, each of said word lists representing a word category, and wherein said generating step comprises categorizing each of said identified words and placing each of said categorized words in one or more of said word lists based on said categorizing step.

3. The method according to claim 2, wherein a first one of said word lists represents a word category including words having at least a predetermined length, and wherein said placing step comprises placing all of the identified words having at least said predetermined length on said first one of said word lists.

4. The method according to claim 2, wherein a plurality of said word lists each represent a word category including words having a particular grammatical classification, and wherein said placing step comprises placing each of one or more of the identified words on an appropriate one of said plurality of word lists based on the grammatical classification of the each of the one or more identified words.

5. The method according to claim 4, wherein said plurality of said word lists comprise a first word list representing nouns and a second word list representing verbs.

6. The method according to claim 4, wherein a first one of said word lists not included within said plurality of word lists represents a word category including words having at least a predetermined length, and wherein said placing step further comprises placing all of the identified words having at least said predetermined length on said first one of said word lists.

7. The method of claim 1, further comprising detecting an input from a touch screen display as being the input from the multiple-axis input device.

8. The method of claim 7, further comprising outputting on the touch screen display a depiction representative of the multiple-axis input device.

9. The method according to claim 1, further comprising storing said one or more word lists and displaying said stored one or more word lists when a subsequent message is generated using said handheld electronic device.

10. The method according to claim 1, further comprising detecting as the input from the multiple-axis input device a scrolling input plus a selection input.

11. A handheld electronic device comprising:
    an input apparatus comprising a multiple-axis input device;
    an output apparatus; and
    a processor apparatus including a processor and a memory, said memory having a messaging application executable by said processor, said messaging application comprising one or more routines adapted to:
    receive a command to reply to or forward a message received by said handheld electronic device, said received message being included within a message thread;
    scan said message thread and identify a plurality of words in said message thread;
    generate one or more word lists that include said words;
    display said one or more word lists on said output apparatus;
    detect an input from the multiple-axis input device as a selection of a selected one of said words from said one or more word lists; and
    enter said selected one of said words into a new message, said new message being displayed on said output apparatus.

12. The handheld electronic device according to claim 11, wherein said one or more word lists comprise a plurality of word lists, each of said word lists representing a word category, and wherein said routines are adapted to generate said one or more words lists by categorizing each of said identified words and placing each of said categorized words in one or more of said word lists based on said categorizing.

13. The handheld electronic device according to claim 12, wherein a first one of said word lists represents a word category including words having at least a predetermined length, and wherein said placing comprises placing all of the identified words having at least said predetermined length on said first one of said word lists.

14. The handheld electronic device according to claim 12, wherein a plurality of said word lists each represent a word category including words having a particular grammatical classification, and wherein said placing comprises placing each of one or more of the identified words on an appropriate one of said plurality of word lists based on the grammatical classification of the each of the one or more identified words.

15. The handheld electronic device according to claim 14, wherein said plurality of said word lists comprise a first word list representing nouns and a second word list representing verbs.

16. The handheld electronic device according to claim 14, wherein a first one of said word lists not included within said plurality of word lists represents a word category including words having at least a predetermined length, and wherein said placing further comprises placing all of the identified words having at least said predetermined length on said first one of said word lists.

17. The handheld electronic device according to claim 11, wherein said routines are adapted scan said message thread and generate said one or more words lists automatically in response to receiving said command to reply to or forward a received message.

18. The handheld electronic device according to claim 11, wherein said routines are adapted to scan said message thread and generate and display said one or more words lists only after receiving a command indicating a desire to have said one or more word lists displayed.

19. The handheld electronic device of claim 11 wherein at least one of the input and the output apparatus comprises at least a component of a touch screen display, and wherein the operations further comprise detecting an input from the at least component of the touch screen display as being the input from the multiple-axis input device.

20. The handheld electronic device according to claim 11, wherein the input from the multiple-axis input device comprises a scrolling input plus a selection input.

* * * * *